United States Patent [19]

Disinger

[11] 3,783,388

[45] Jan. 1, 1974

[54] MULTIPLE CARRIER FREQUENCY MODULATED SIGNAL GENERATING APPARATUS

[75] Inventor: Donald E. Disinger, North Tonawanda, N.Y.

[73] Assignee: GTE Sylvania Incorporated, Stamford, Conn.

[22] Filed: Jan. 20, 1972

[21] Appl. No.: 219,364

[52] U.S. Cl. .................................. 325/363, 331/47

[51] Int. Cl. .......................................... H03b 21/00

[58] Field of Search.................... 325/105, 134, 363; 331/46, 47, 107 R, 145; 321/69 NL; 307/291

[56] References Cited

UNITED STATES PATENTS

| | | | |
|---|---|---|---|
| 3,605,022 | 9/1971 | Fillipo et al. | 325/363 |
| 3,353,181 | 11/1967 | Preuss | 325/363 |
| 3,299,294 | 1/1967 | Koehler | 321/69 NL |
| 3,183,368 | 5/1965 | Ross | 331/145 |
| 2,879,412 | 3/1959 | Hoge et al. | 331/145 |

*Primary Examiner*—Robert L. Griffin
*Assistant Examiner*—A. M. Psitos
*Attorney*—Norman J. O'Malley et al.

[57] ABSTRACT

Signal generator for use in testing FM communication receivers including a triggered free-running multivibrator which may be synchronized to operate at a frequency equal to the spacing between adjacent channels of the FM receiver. An audio oscillator modulates the output of the multivibrator which output is applied to a step recovery diode. The output of the step recovery diode is a plurality of harmonics of the frequency of the multivibrator each frequency modulated at the frequency of the audio oscillator.

5 Claims, 1 Drawing Figure

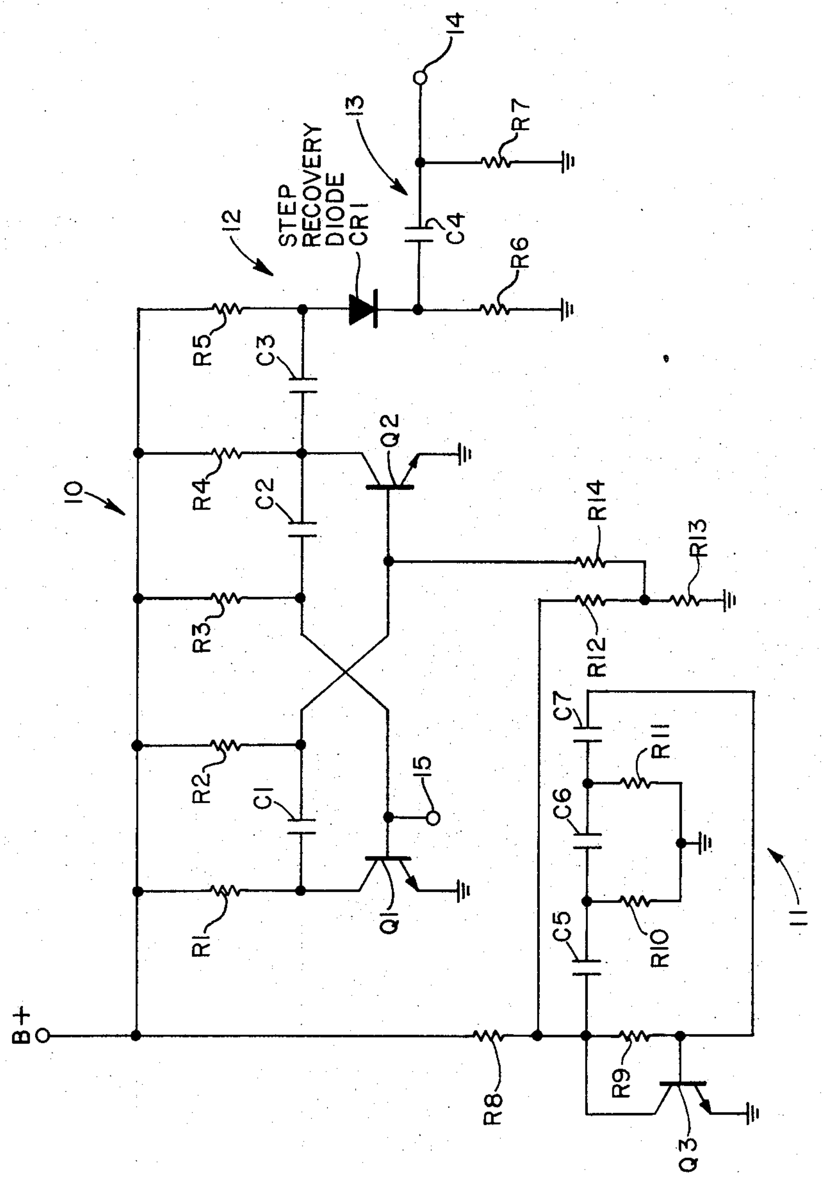
B+
STEP
RECOVERY
DIODE
CR1
10
11
12
13
14
15
R1
R2
R3
R4
R5
R6
R7
R8
R9
R10
R11
R12
R13
R14
C1
C2
C3
C4
C5
C6
C7
Q1
Q2
Q3

MULTIPLE CARRIER FREQUENCY MODULATED SIGNAL GENERATING APPARATUS

BACKGROUND OF THE INVENTION

This invention relates to apparatus for generating a spectrum of modulated frequencies. More particularly, it is concerned with apparatus for generating a plurality of audio modulated carrier frequencies for use in testing broadband FM receivers.

The operation of broadband FM communication receivers on all channels of communication may be checked by test equipment which produces an audio modulated signal at each carrier frequency. The test signals are applied at the antenna connection of an FM receiver and the detection of the audio tone on a selected channel is an indication that the receiver is operating properly on that channel. For use under field conditions the test equipment should by small and self-contained. It is desirable that the test equipment be sufficiently small that it can be built into the FM receiver so as to permit immediate checking of receiver operation at any time at any place.

Various techniques have benn employed to generate the broadband spectrum of audio modulated carrier frequencies for testing FM receivers. Broadband noise generators including mechanically discharged coaxial lines containing a stored charge have been employed. The RF frequencies produced have been amplitude modulated with audio frequency signals. However, amplitude modulated signals do not provide a full test of all sections of an FM receiver. If a receiver is modified in order to utilize amplitude modulated signals for testing, additional circuitry is required.

Test equipment has been developed in which the various carrier frequencies are frequency modulated. However, the modulation of signals produced by apparatus of this type heretofore available varies with carrier frequency.

SUMMARY OF THE INVENTION

Apparatus producing true sinusoidal modulated FM signals for use in testing broadband FM receivers is provided by multiple carrier frequency modulated signal generating apparatus in accordance with the present invention. The apparatus includes a first oscillator means which produces a signal of a basic frequency at its output connection. The basic frequency may be equal to the spacing between adjacent channels, or carrier frequencies, of the FM receiver to be tested. A second oscillator means is coupled to the first oscillator means and operates to vary the signal at the output of the first oscillator means from the basic frequency by a predetermined amount and at a predetermined rate.

The apparatus includes spectrum generating means which produces at its output a plurality of harmonics of the signal applied at its input. The output connection of the first oscillator means is coupled to the input of the spectrum generating means. The spectrum generating means thus produces a plurality of output signals, each of which is a harmonic of the basic frequency varying by an amount equal to the same harmonic of the predetermined amount and at a rate equal to the predetermined rate. Thus, a spectrum of carrier frequencies each of which is frequency modulated at the same audio frequency is available for testing all the communication channels of an FM receiver.

BRIEF DESCRIPTION OF THE DRAWING

Additional objects, features, and advantages of signal generating apparatus in accordance with the present invention will be apparent from the following detailed discussion together with the accompanying drawing wherein the single FIGURE is a schematic circuit diagram of a multiple carrier frequency modulated signal generating apparatus in accordance with the invention for use in testing broadband FM receivers.

DETAILED DESCRIPTION OF THE INVENTION

Multiple carrier frequency modulated signal generating apparatus for testing broadband FM receivers as illustrated in the schematic circuit diagram of the single FIGURE of the drawing includes a triggered free-running multivibrator 10. The multivibrator produces pulses at a basic frequency which is equal to the spacing between adjacent channels of the receiver to be tested. The apparatus also includes an RC coupled oscillator 11 which produces a signal at an audio frequency. The output of the audio oscillator 11 is coupled to the multivibrator or basic frequency oscillator 10 to frequency modulate the output of the basic frequency oscillator. The apparatus also includes a spectrum generator 12 for producing a plurality of frequency modulated carrier frequencies from the frequency modulated basic frequency. A shaping network 13 for equalizing the amplitudes of the output signals is connected between the spectrum generator 12 and an output terminal 14.

The free-running multivibrator 10 as illustrated is a well known type of multivibrator employing a pair of NPN transistors Q1 and Q2 having their bases and collectors cross-coupled by way of capacitors C1 and C2. The multivibrator may be synchronized by a stabilizing reference frequency applied to terminal 15 at the base of transistor Q1. The stabilizing frequency may be obtained from the frequency synthesizer of the FM receiver to be tested so as to synchronize operation of the multivibrator at a basic frequency equal to the frequency spacing between adjacent channels of the FM receiver.

The audio oscillator 11 as illustrated is an RC coupled oscillator employing a single NPN transistor Q3. The output of the audio oscillator 11 is taken from the collector of transistor Q3 by way of a network of resistances R12, R13, and R14 and applied to the base of transistor Q2 of the multivibrator 10. The values of resistances R12 and R13 determine the amplitude of the audio signal from the audio oscillator 11, and thus the amount of deviation of the output frequency from the multivibrator 10. Resistance R14 isolates the multivibrator 10 from the audio oscillator 11.

The spectrum generator 12 includes a step recovery diode CR1 connected between the B+ voltage and ground in series with resistances R5 and R6. The diode is an impulse type spectrum generator which produces a spectrum of frequencies by generating pulses of energy having an extremely steep rise time at a repeating rate. Energy is concentrated at multiples of the repetition rate at which pulses are generated, and the maximum upper frequency obtainable and the uniformity of amplitude of the frequencies are determined by the steepness of the pulses.

A coupling capacitor C3 is connected between the collector of transistor Q2 of the multivibrator 10 and the anode of the step recovery diode CR1. The output of the spectrum generator 12 is taken at the cathode of the step recovery diode CR1 and coupled to the output terminal 14 through a shaping network 13 of capacitance C4 and resistance R7.

The multivibrator 10 produces a series of rectangular pulses at a basic frequency, which, as explained, may be synchronized by a reference frequency applied at terminal 15. The audio oscillator 11 operates at an audio frequency and modulates the basic frequency of the multivibrator 10. The output of the multivibrator 10 at the collector of transistor Q2 varies about the basic frequency by an amount which is determined by the values of resistances R12 and R13 and at the rate of the audio frequency.

During operation of the multivibrator 10 while transistor Q2 is non-conducting, its collector is positive and capacitance C3 becomes charged, positive at the terminal connected to the transistor collector and negative at the terminal connected to the anode of the diode CR1. During this period the step recovery diode CR1 is in a conducting condition with current flowing through resistances R5 and R6. During the next half cycle transistor Q2 conducts heavily and the collector voltage drops to near ground. The accumulated charge in capacitance C3 causes a reversal of the potential at the anode of the step recovery diode CR1 causing an instantaneous reversal of current flow through the diode CR1 and resistance R6 until the stored charge of minority carriers at the junction of the diode CR1 is dissipated.

The pulses of energy produced in resistance R6 by reversals of current through the step recovery diode CR1 produce a spectrum of frequencies with energy concentrated at multiples of the repetition rate of the pulses. Since the output of the multivibrator 10 deviates from the basic frequency by a particular amount, the output signals from the spectrum generator 12 are a plurality of harmonics of the basic frequency each harmonic varying in frequency by an amount equal to the same harmonic of the particular amount. The rate at which the frequencies vary is the same for each harmonic, the rate being equal to the audio frequency of the audio oscillator 11.

The shaping network 13 of capacitance C4 and resistance R7 attenuates the output signals from the spectrum generator 12 by an amount inversely related to the frequency. Thus, since the higher harmonics are of lesser amplitude, the shaping network 13 tends to equalize the amplitudes of the output signals by reducing their differences.

Apparatus in accordance with the foregoing detailed description has been fabricated employing particular components as listed below.

Q1 — 2N3904
Q2 — 2N3904
Q3 — 2N3904
CR1 — 1N4949 step recovery diode
R1 — 560 ohms
R2 — 6.8 K ohms
R3 — 15 K ohms
R4 — 6.8 K ohms
R5 — 4.7 K ohms
R6 — 15 ohms
R7 — 51 ohms
R8 — 1.8 K ohms
R9 — 100 K ohms
R10 — 1.2 K ohms
R11 — 3.9 K ohms
R12 — 130 K ohms
R13 — 10 K ohms
R14 — 270 K ohms
C1 — 3,000 p farads
C2 — 3,000 p farads
C3 — 10,000 p farads
C4 — 27 p farads
C5 — 2,700 p farads
C6 — 2,700 p farads
C7 — 2,700 p farads
B+ — +9 volts D.C.

This apparatus was designed for testing FM communication receivers in the 30 to 80 megahertz range with separation between channels of 50 kilohertz. The component values of the free-running multivibrator as listed provided a waveform of a series of pulses at slightly less than 50 kilohertz, and the multivibrator was synchronized at 50 kilohertz by triggering with a 50 kilohertz reference signal at the terminal 15. The frequency of the audio oscillator 11 was approximately 1,000 hertz. The values of resistances R12 and R13 caused the basic frequency of 50 kilohertz to deviate by approximately 6⅔ hertz so that at a carrier frequency of 60 megahertz (the 1,200th harmonic) the amount of deviation was about 8,000 hertz.

The amount of deviation from the basic frequency may be changed by changing the values of resistances R12 and R13. Thus, the amount of deviation can be made constant, or nearly constant, throughout the operating range of a receiver by selection of appropriate values for resistance R12 and R13 for different channels to be tested.

In addition, the value of resistance R5 in the spectrum generator 12 can be variable so that the amplitude of a particular output signal at the output terminal 14 can be set at a particular desired level. This information can then be used to enable setting of the squelch threshold of the FM receiver at the desired level.

Thus, while there has been shown and described what is considered a preferred embodiment of the present invention, it will be obvious to those skilled in the art that various changes and modifications may be made therein without departing from the invention as defined by the appended claims.

What is claimed is:

1. Multiple carrier frequency modulated signal generating apparatus including in combination first oscillator means operable to produce a signal of a basic frequency at an output connection;

second oscillator means coupled to the first oscillator means and operable to vary the signal at the output connection of the first oscillator means from the basic frequency by a predetermined amount and at a predetermined rate;

spectrum generating means including a step recovery diode operable to produce at its output electrode a plurality of harmonics of the signal applied at its input electrode; and means connecting the output connection of the first oscillator means to the input electrode of the step recovery diode for coupling the signal at the output connection of the first oscillator means to the input electrode of the step recovery diode;

whereby the spectrum generating means produces a plurality of output signals each of which is a harmonic of the basic frequency varying by an amount equal to the same harmonic of the predetermined amount and at a rate equal to the predetermined rate.

2. Multiple carrier frequency modulated signal generating apparatus in accordance with claim 1 wherein said first oscillator means includes a triggered free-running multivibrator employing first and second cross-coupled transistors, and the output connection from the first oscillator means is at the collector of the first transistor; and said second oscillator means is coupled to the base of the first transistor.

3. Multiple carrier frequency modulated signal generating apparatus in accordance with claim 2 wherein said means connecting the output connection of the first oscillator means to the input electrode of the step recovery diode includes a capacitance operable to be charged when the first transistor is in the non-conducting condition and to be discharged rapidly when the first transistor becomes conducting, thereby causing a rapid reversal of current flow through the step recovery diode.

4. Multiple carrier frequency modulated signal generating apparatus in accordance with claim 4 including signal shaping means connected to the output electrode of the step recovery diode and operable to attenuate the plurality of output signals from the spectrum generating means by an amount inversely related to the frequency of the output signals whereby differences in the amplitudes of the output signals are reduced.

5. Multiple carrier frequency modulated signal generating apparatus in accordance with claim 4 and operable for testing an FM receiver wherein said first oscillator means is adapted to be synchronized by a reference frequency signal to produce a signal of a basic frequency equal to the spacing between carrier frequencies of the FM receiver; and said second oscillator means operates at an audio frequency.

* * * * *